June 16, 1959     H. D. CRANDON     2,890,486
MOLD FOR PRODUCING LENS OF ANY SHAPE
FROM A POLYMERIZABLE MATERIAL
Filed Aug. 29, 1955
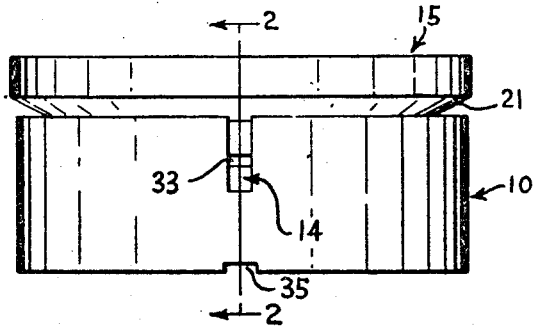
Fig. 1
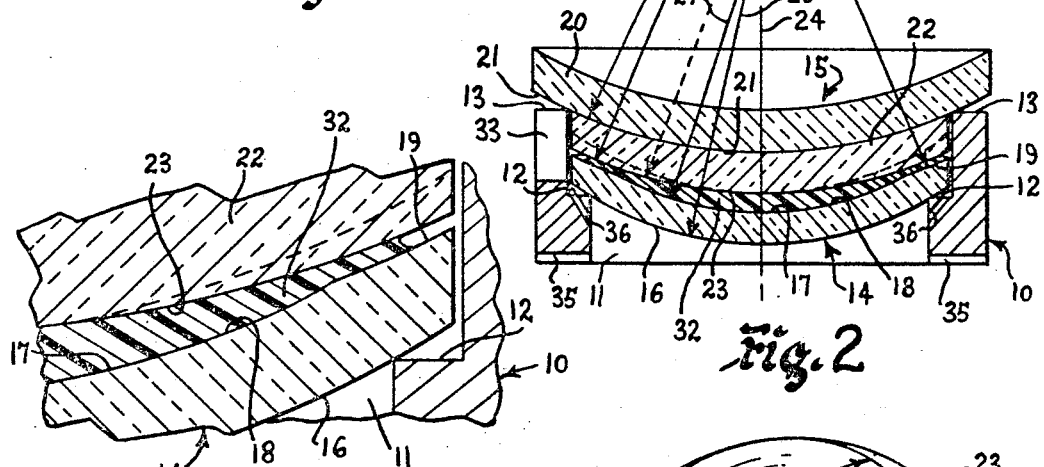
Fig. 2
Fig. 3
Fig. 4
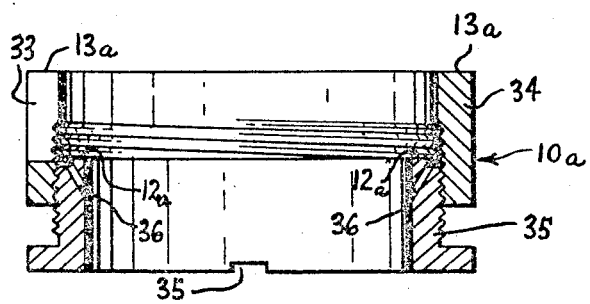
Fig. 5
INVENTOR
HARRY D. CRANDON
BY
*Louis L. Gagnon*
ATTORNEY

United States Patent Office 2,890,486
Patented June 16, 1959

2,890,486

MOLD FOR PRODUCING LENS OF ANY SHAPE FROM A POLYMERIZABLE MATERIAL

Harry D. Crandon, Woodstock, Conn., assignor to American Optical Company, Southbridge, Mass., a voluntary association of Massachusetts Application August 29, 1955, Serial No. 531,226

2 Claims. (Cl. 18—39)

This invention relates to casting devices and has particular reference to improved means of producing optical elements from resinous materials.

In producing optical elements such as lenses or the like from resinous materials, the perfection of the surfaces of the optical elements and the retention of the desired optical properties in the resultant elements are of high importance. Heretofore, the forming of such optical elements have generally embodied intricate, cumbersome and expensive equipment, particularly in the production of elements requiring the forming of complex surface curvatures wherein the resultant surface curvatures must conform to precise predetermined values.

It is, therefore, a principal object of this invention to provide a simple, inexpensive and efficient means of producing optical elements from resinous materials.

Another object is to provide a means of forming precision optical elements by the use of a novel mold device embodying a pair of separate mold halves disposed in a predetermined spaced relation upon a supporting fixture whereby a supply of resinous material placed between said mold halves will subsequently receive opposed surface shapes corresponding to the shapes of the adjacent surfaces of said mold halves.

Another object is to provide a mold device of the above character for forming optical lens elements or the like wherein the adjacent forming surfaces of the mold halves will be so spaced as to provide a molding cavity therebetween for receiving the resinous material used to form the lens element, said cavity having the central portion thereof designed to substantially the shape desired of the finished lens element and an annular edge portion surrounding said central portion for receiving an overflow of said resinous material sufficient to cause said central portion of the cavity throughout the area desired of the finished lens to be completely filled with said resinous material.

Another object is to provide a mold for casting optical elements or the like having a pair of mold halves spaced to form a cavity therebetween, said cavity having a central portion of substantially the shape and at least of the area desired of the finished optical element to be cast therein and an annular edge portion surrounding said central portion which at the entrance to said central portion is of a height or thickness substantially equal to or slightly greater than the desired edge thickness of the resultant optical element to be cast in said central portion and further having its outer portion provided with spaced upper and lower surfaces which, from said entrance to said central portion toward the outer edge of the mold, are so related as to taper slightly toward each other along at least one of the major meridians of the mold curvatures to permit free, unrestricted inward movement of the resinous material caused by the inherent shrinking thereof, during the polymerization of the optical element being formed within the cavity.

Another object is to provide a device of the above character wherein one of the mold halves, during polymerization of the resinous material and resultant shrinkage thereof, may be drawn toward the opposed mold half by the resinous material through its inherent propensity to adhere to the mold halves.

Another object is to provide a mold device of the above character wherein the mold halves are formed of glass having the surfaces thereof optically ground and polished to predetermined curvatures whereby the resultant resinous optical elements formed thereby will be provided with surfaces having a high degree of perfection.

Another object is to provide a mold device having mold halves so shaped as to allow movement thereof, within limitations, without altering the optical properties of the resultant optical elements formed therein.

Another object is to provide a mold device of the above character having an adjustable supporting fixture for controlling the thickness of the resultant resinous optical elements.

Another object is to provide a device of the above character which may be used to cast optical elements such as lenses or the like embodying any of the well known prescriptive requirements of the trade.

Other objects and advantages of the present invention will become apparent from the following description when taken in conjunction with the accompanying drawings, in which:

Fig. 1 is a front elevational view of the device embodying the invention;

Fig. 2 is a cross-sectional view of the device taken on line 2—2 of Fig. 1 and looking in the direction of the arrows;

Fig. 3 is an enlarged fragmentary sectional view of an edge portion of the mold halves of the device illustrating the slightly tapered relation of the outer adjacent surface portions of said mold halves;

Fig. 4 is a perspective view of the upper mold half; and

Fig. 5 is a section view of a modified form of supporting member for a mold of the character described.

Referring more particularly to the drawings wherein like characters of reference designate like parts throughout the several views, the device embodying the invention comprises a cylindrical supporting member 10 having a longitudinal bore 11 therethrough with the upper portion of said bore 11 being of a diameter greater than that of the lower portion thereof so as to form an annular shelf 12 around the interior of the supporting member 10 (Figs. 2 and 3).

The upper end of the supporting member 10, which in effect forms a second annular shelf 13, is spaced a predetermined distance from shelf 12 and is formed to lie in a plane parallel to that of shelf 12 with the centers of the inner annular edges of said shelves 12 and 13 being coaxial.

A pair of circular mold halves 14 and 15, preferably formed of glass, are positioned upon the respective shelves 12 and 13. The lower mold half 14 has an outer diameter greater than that of the inner annular edge of shelf 12 but slightly less than the diameter of the inner wall of the upper portion of bore 11. The said lower mold half 14 is provided with a lower predetermined convex spherical surface 16 which engages said inner annular edge of the shelf 12. Figs. 2 and 3, and has an upper concave highly polished lenticular surface 17 thereon. The curvature of the central portion 18 of said upper surface 17 is formed substantially concentric with said lower surface 16 and is of a radius of curvature substantially equal to the radius of curvature desired upon one surface of the optical element to be cast thereby whereas the annular edge portion 19 of said surface 17 is formed with a carefully selected longer radius of curvature than that of the central portion 18. The radius of curvature of the convex spherical surface 16 is controlled in accordance with the radius of curvature required of the central portion 18 and so as to be concentric therewith.

The upper mold half 15, also preferably formed of glass, comprises a circular carrier portion 20 having a convex spherically shaped lower surface 21 to which a circularly shaped forming portion 22 is fused, cemented, or otherwise attached. Said carrier portion 20 is of a size sufficient to overlie the shelf 13 with the lower surface 21 thereof engaging the inner annular edge of said shelf 13 whereas the forming portion 22 is of a size slightly smaller than the diameter of the bore 11 and sufficient only to allow said portion 22 to be loosely fitted within the bore 11, as shown in Figs. 2 and 3.

The lower surface 23 of said forming portion 22 is provided with an optically polished predetermined shape formed in accordance with the optical properties desired of the optical element to be cast thereby.

It can therefore be seen that with the mold halves 14 and 15 positioned so as to engage the inner annular edge portion of their respective shelves 12 and 13 (Fig. 2) that a cavity will be formed between the molding surfaces 17 and 23 thereof and that the height of said cavity, which will ultimately determine the thickness of the optical element cast therein, will be controlled by the spacing between the shelves 12 and 13 of the supporting member 10 and the related thicknesses to which the portions 14 and 22 are formed.

In instances where optical elements having complex surface curvatures such as toric lenses or the like are to be cast by the device embodying the invention as illustrated in Figs. 1, 2 and 3, *the* desired toric surface to be cast upon one side of the lens element is applied to the lower surface 23 of portion 22 of the upper mold half 15 as shown best in Fig. 4. The axis line *a* represents the base curve and axis line *b* represents the cylinder curve of said toric surface and the central portion 18 of the casting surface 17 of lower mold half 14 is provided with the desired spherical curvature to be cast upon the opposed side of the optical element to be formed.

In order to provide a means of completely filling the central portion of the cavity between the adjacent surfaces of the mold halves 14 and 15 with a resinous material or the like while maintaining the desired spacing between said mold halves, the edge portion 19 of surface 17 is provided with a radius of curvature slightly shorter than that of the base curve of toric surface 23 thus providing a slightly outwardly tapering space between the adjacent surfaces at the outer edge portions of said cavity at least along the axis *a* of the toric surface 23.

Said edge portions will then function to receive an overflow of resinous material when the upper mold half 15 is assembled with the lower mold half 14 and will insure the filling of the central portion of the cavity (Figs. 2 and 3). The outwardly tapered relation of the adjacent surfaces of the outer edge portions of the cavity provides clearance for permitting the retraction or inward movement of the resinous material due to shrinking which normally takes place during the polymerization thereof.

The above construction is best illustrated by Fig. 3 wherein an enlarged sectional view of an edge portion of the mold halves is taken substantially along axis *a* of surface 23.

Due to the fact that the inner annular edge of the shelf 12 and the inner annular edge of shelf 13 are coaxial with each other as indicated by line 24, Fig. 2, and that the surfaces 16 and 18 of the mold half 14 are concentric with their centers of curvature lying on line 24 as indicated by numeral 25, it can be seen that slight lateral movement of mold half 14 will not affect the resultant optical porperties of the lens element cast thereby since the center 25 will remain on line 24.

In order to provide for the casting of lenses of different graded powers in accordance with known practice in the ophthalmic art there is provided a series of mold halves 14 of different graded surface curvatures and a series of mold halves 15 of different graded surface curvatures.

In forming a toric lens element in a device of this character mold halves 14 and 15 are selected which have suitable casting surface shapes 17 and 23 thereon for transferring to the resultant lens element the desired surface curvatures. For example, in order to form a lens element having a +3.00 diopter sphere combined with a —2.00 diopter cylinder and thickness of 3.6 mm. with material having an index of refraction of approximately 1.53, as illustrated in Fig. 2, the lower mold half 14 would have a surface 17 with a central curvature 18 of a radius 27 of —9.301 diopters. The surface 16, to be concentric with curvature 18 has a radius 26 of +8.399 diopters. The upper mold half 15 would have a surface 23 with a base radius 29 of +6.335 diopters, a cylinder radius 30 of +8.446 diopters and the surface 21 of the carrier portion 20 has a radius 31 of —6.00 diopters. The upper surface of carrier portion 21 is shown concave in Fig. 2 but may be formed to any desired shape.

In order to provide the outwardly tapering relation of the outer surface portions of the surfaces 17 and 23 the outer portion 19 of surface 17 is provided with a radius 28 of —6.335 diopters and which is of a shorter radius than the radius 29.

In order to obtain the resultant thickness desired the spaced relation of the ledges 12 and 13 and the thicknesses of the portions 14 and 22 are controlled in accordance with the known extent of shrinkage of the particular plastic material used.

It is to be noted that lens elements having any desired optical properties may be formed with the device embodying the invention by controlling the curvatures of the forming surfaces 17 and 23 of the mold halves, the index of refraction of the material used and the thicknesses of the resultant lens elements and it is also to be pointed out that the adjacent surfaces 23 and 17 of the mold halves are preferably highly optically polished so that the resultant lens elements formed thereby will be provided with surfaces having a finish of high optical perfection.

After selecting the mold halves 14 and 15 to produce a lens element having the desired optical properties and assembling them in related positions upon a proper supporting member 10, resinous material 32 of a controlled amount having initially flowable characteristics is inserted between the mold halves. The resinous material may be any suitable thermosetting, thermoplastic or other artificial resinous substance which may be polymerized to result in the formation of a substantially hard, transparent plastic such as polycyclohexyl methacrylate, polystyrene, or polymethyl methacrylate. The selected resin can be either injected through an opening or notch 33 in the wall of the supporting member 10 or may be placed upon the central portion 18 of the upper surface 17 of the mold half 14 before the mold half 15 is positioned upon the shelf 13. A sufficient amount of said resin would be applied to completely fill the cavity between the surfaces 23 and 18 in which case the spacing between the annular edge portions of the mold halves 14 and 15 will be substantially filled.

In the usual manner of casting, application of heat to the device will cause polymerization of the resinous material and cause it to consequently take the shape of the surfaces 17 and 23. The lens thus formed is then removed and subsequently formed to the desired contour size and shape and the opposed surfaces thereof will be highly optically perfect due to the use of the highly polished glass surfaces 17 and 23 of the mold halves.

It will be noted here that since resinous materials shrink during polymerization, the lens element when shrinking will draw the lower mold half upwardly off the shelf 12 due to the inherent tenacity of the resinous material and will simultaneously draw inwardly from the annular edge portions of the mold halves. However, since the lower mold half 14 is free to be raised upwardly and the edge portions of said mold halves are formed with slightly outwardly tapering spacings therebetween along at least one of the major meridians of the toric surface 23 as described above, the above shrinking effect of the resin will not be restrained.

In devices where the movement of the mold halves are restrained and the edge portions of the cavity do not permit free inward movement of the resin during polymerization, the shrinkage will result in a tendency for the resinous material to pull away from the mold halves in some areas, thus resulting in imperfectly formed optical surfaces.

In the device embodying the invention, however, this shrinkage is compensated for in order to arrive at the finished thickness desired of the optical element.

In instances where it is desired to polymerize the resinous material in the presence of a gas such as $CO_2$ when casting an optical element, the desired atmosphere can be achieved by admitting the gas into the interior of the supporting member 10 through the notch 33, Figs. 1, 2 and 5, or through one or more openings 35 in the lower portion of the supporting member 10. The gas will pass from the interior of the member 10 through parts 36 connecting said interior with shelf 12 from which it can pass around the edge of the lower mold half 14 to the resinous material 32.

Supporting members 10 having different dimensional characteristics can be provided or one which can be adjusted to form lenses of different desired thicknesses may be used. Adjustable means is illustrated in Fig. 5 wherein the member 10a is formed of two separate pieces, an upper ring-like portion 34 which is internally threaded and a lower ring-like portion 35 which is externally threaded for cooperative engagement with the upper portion 34. The portion 35 can thus be adjusted within portion 34 to position the shelf 12a thereof in desired spaced relation with the shelf 13a of the portion 34 and thereby cause the adjacent surfaces 23 and 17 of the mold halves 14 and 15, when assembled therewith, to be spaced in accordance with the thickness desired of the resultant lens.

Although the shelves 12 and 13 of the supporting member 10 and the shelves 12a and 13a of the supporting member 10a are formed continuous and described to form unbroken ring-like seats for the respective mold halves 14 and 15, it is to be understood that, if desired, they be shaped so as to provide a series of points of suspension numbering at least three located in the arc of a circle and in spaced parallel planes, rather than being continuous which would also support the mold halves in the manner desired.

From the foregoing description, it will be seen that simple, efficient and economical means have been provided for accomplishing all the objects and advantages of the invention. However, it will be understood that various omissions, substitutions and changes in the form and details of the embodiment illustrated may be made by those skilled in the art and that all matter herein is to be interpreted as illustrative and not in a limiting sense.

Having described the invention, I claim:

1. A device of the character described for use in forming plastic optical elements comprising the combination of a hollow supporting member having contact portions disposed in circular paths coaxial with the axis of said supporting member and in controlled vertically spaced relation with each other, a pair of glass mold halves each being adapted to be positioned upon a respective contact portion, the upper one of said glass mold halves embodying a main supporting portion having a convex spherical undersurface thereon, the outer portion of which is adapted to engage with the upper contact portion, said glass mold half having a separate depending glass portion of a controlled thickness formed with an upper concave spherical surface of a radius of curvature such as to intimately fit the central area of said convex spherical undersurface and secured to said area, said depending portion being of a contour shape and diameter such as to closely fit internally of the hollow supporting member when said outer portion of said convex spherical undersurface of said main supporting portion is in engagement with said upper contact portion and having a lower convex toric surface thereon of a shape controlled in accordance with the shape of surface desired on the concave side of the optical element to be formed thereby and the other of said glass mold halves being of a contour shape and diameter to closely fit internally of the hollow supporting member and having a lower convex spherical surface for engaging the lowermost of said contact portions and having an upper lenticular surface, said mold half being of a thickness controlled in accordance with the thickness of the depending central portion of the first mold half and in accordance with the spaced relation of the contacting portions of the hollow supporting member so as to locate said lenticular surface in desired spaced relation with the lower convex toric surface of the depending central portion, the central area of said upper lenticular surface being concave and of a radius of curvature desired on the convex side of said optical element to be formed thereby and being of a diameter at least as great as the diameter desired of the finished optical element, said upper lenticular surface further having an outer surface of a different curvature surrounding the surface of said central concave area and having its radius of curvature controlled in accordance with the radius of curvature of the lower convex toric surface of the depending central portion along at least one major meridian of said toric surface so that the said surfaces do not converge in an inward direction with respect to each other, the radius of curvature of said outer surrounding surface of said second mold half being so controlled that the upper peripheral edge of said surrounding surface will lie in a plane above the central area of the lower surface of the depending central portion of the first mold half within a contour defined by the line of mergence between the central concave surface and the outer surrounding surface of different curvature on the upper side of said second mold half whereby the plastic material from which the optical element is to be formed may flow to a level which will insure the complete filling in of the central lens forming portions of said mold halves with the surrounding outer surface portion of said mold halves functioning to receive an overflow of said material and because of said non-inwardly converging relation of said outer surface portions with respect to each other along said one major meridian of said lower convex surface uninterrupted inward shrinkage of said plastic material will take place without altering the shape of the main lens portion as said plastic material sets and hardens to the shape of said effective lens forming surface portions of said mold halves.

2. A device of the character described for use in forming plastic optical elements comprising the combination of a hollow supporting member having contact portions disposed in circular paths coaxial with the axis of said supporting member and in controlled vertically spaced relation with each other, a pair of glass mold halves each being adapted to be positioned upon a respective contact portion, the upper one of said glass mold halves embodying a main supporting portion having a convex spherical undersurface thereon, the outer portion of which in adapted to engage with the upper contact portion, said glass mold half having a separate depending glass portion of a controlled thickness formed with an upper concave spherical surface of a radius of curvature such as to intimately fit the central area of said convex spherical undersurface and adhesively secured to said area, said depending portion being of a contour shape and of a smaller diameter than the main supporting portion and such as to closely fit internally of the hollow supporting member when said outer portion of said convex spherical undersurface of said main supporting portion is in engagement with said upper contact portion and having a lower convex toric surface thereon of a shape controlled in accordance with the shape of surface desired on the concave side of the optical element to be formed thereby and the other of said glass mold halves being of a contour shape and diameter to closely fit internally of the hollow supporting member and having a lower convex spherical surface for engaging the lowermost of said contact portions and having an upper lenticular surface, said mold half being of a thickness controlled in accordance with the thickness of the depending central portion of the first mold half and in accordance with the spaced relation of the contacting portions of the hollow supporting member so as to locate said lenticular surface in desired spaced relation with the lower convex toric surface of the depending central portion, the central area of said upper lenticular surface being concave and of a radius of curvature desired on the convex side of said optical element to be formed thereby and being of a diameter at least as great as the diameter desired of the finished optical element, said upper lenticular surface further having an outer surface of a different curvature surrounding the surface of said central concave area and having its radius of curvature controlled in accordance with the radius of curvature of the lower convex toric surface of the depending central portion along at least one major meridian of said toric surface so that the said surfaces do not converge in an inward direction with respect to each other, the radius of curvature of said outer surrounding surface of said second mold half being so controlled that the upper peripheral edge of said surrounding surface will lie in a plane above the central area of the lower surface of the depending central portion of the first mold half within a contour defined by the line of mergence between the central concave surface and the outer surrounding surface of different curvature on the upper side of said second mold half whereby the plastic material from which the optical element is to be formed may flow to a level which will insure the complete filling in of the central lens forming portions of said mold halves with the surrounding outer surface portion of said mold halves functioning to receive an overflow of said material and because of said non-inwardly converging relation of said outer surface portions with respect to each other along said one major meridian of said lower convex surface uninterrupted inward shrinkage of said plastic material will take place without altering the shape of the main lens portion as said plastic material sets and hardens to the shape of said effective lens forming surface portions of said mold halves.

References Cited in the file of this patent
UNITED STATES PATENTS

| | | |
|---|---|---|
| 2,333,131 | Tillyer et al. | Nov. 2, 1943 |
| 2,406,361 | Fairbank et al. | Aug. 27, 1946 |
| 2,516,373 | Ehlert et al. | July 25, 1950 |
| 2,635,289 | Owens | Apr. 21, 1953 |
| 2,728,106 | Herman et al. | Dec. 27, 1955 |